US008854521B2

(12) United States Patent
Yamashita et al.

(10) Patent No.: US 8,854,521 B2
(45) Date of Patent: Oct. 7, 2014

(54) SOLID-STATE IMAGE SENSING DEVICE AND CONTROL METHOD OF SOLID-STATE IMAGE SENSING DEVICE

(75) Inventors: Tomonori Yamashita, Yokohama (JP); Tomohiro Matsuura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 114 days.

(21) Appl. No.: 13/603,728

(22) Filed: Sep. 5, 2012

(65) Prior Publication Data

US 2013/0063643 A1    Mar. 14, 2013

(30) Foreign Application Priority Data

Sep. 14, 2011  (JP) ................................. 2011-200774

(51) Int. Cl.
   *H04N 3/14*       (2006.01)
   *H04N 5/376*      (2011.01)
   *H04N 5/374*      (2011.01)

(52) U.S. Cl.
   CPC ............. *H04N 5/3741* (2013.01); *H04N 5/376* (2013.01)
   USPC ......................................... 348/308; 348/294

(58) Field of Classification Search
   USPC ....................... 348/308, 311, 294; 250/208.1; 257/291–292
   See application file for complete search history.

(56) References Cited

U.S. PATENT DOCUMENTS

| 2007/0024726 A1 | 2/2007 | Nomoto et al. |
| 2007/0076110 A1 | 4/2007 | Mabuchi |
| 2010/0264298 A1* | 10/2010 | Ryoki et al. ............... 250/208.1 |
| 2011/0013065 A1* | 1/2011 | Shinohara .................... 348/302 |

FOREIGN PATENT DOCUMENTS

| JP | 63-299268 A | 12/1988 |
| JP | 2004-343529 | 12/2004 |
| JP | 2004-343529 A | 12/2004 |
| JP | 2009-182992 A | 8/2009 |

OTHER PUBLICATIONS

Office Action issued Jan. 28, 2014 in Japanese Patent Application No. 2011-200774 (with English language translation).

* cited by examiner

*Primary Examiner* — Mekonnen Dagnew

(74) *Attorney, Agent, or Firm* — Oblon, Spivak, McClelland, Maier & Neustadt, L.L.P.

(57) ABSTRACT

According to one embodiment, a solid-state image sensing device includes a pixel including a photoelectric conversion element, a signal detection unit, transistors, and a control signal selection circuit to select a control signal applied to the control signal line. The control signal selection circuit sets a potential of the control signal line at a first potential level while the pixel signal is read from the pixel, the control signal selection circuit sets the potential of the control signal line at a second potential level when the pixel is set in an unselected state, and the control signal selection circuit sets the potential of the control signal line at a third potential level after the pixel is set in the unselected state.

20 Claims, 5 Drawing Sheets

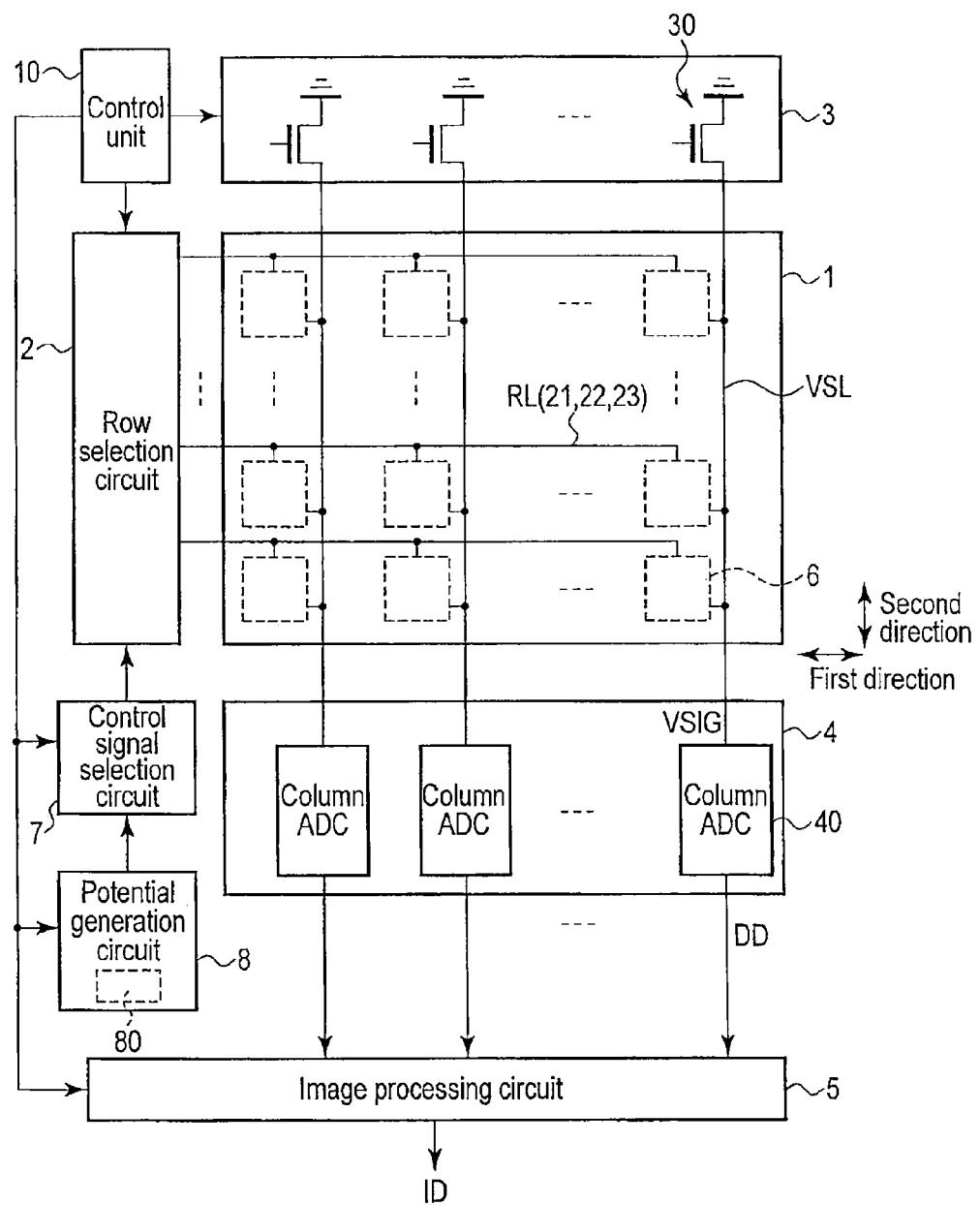
F I G. 1

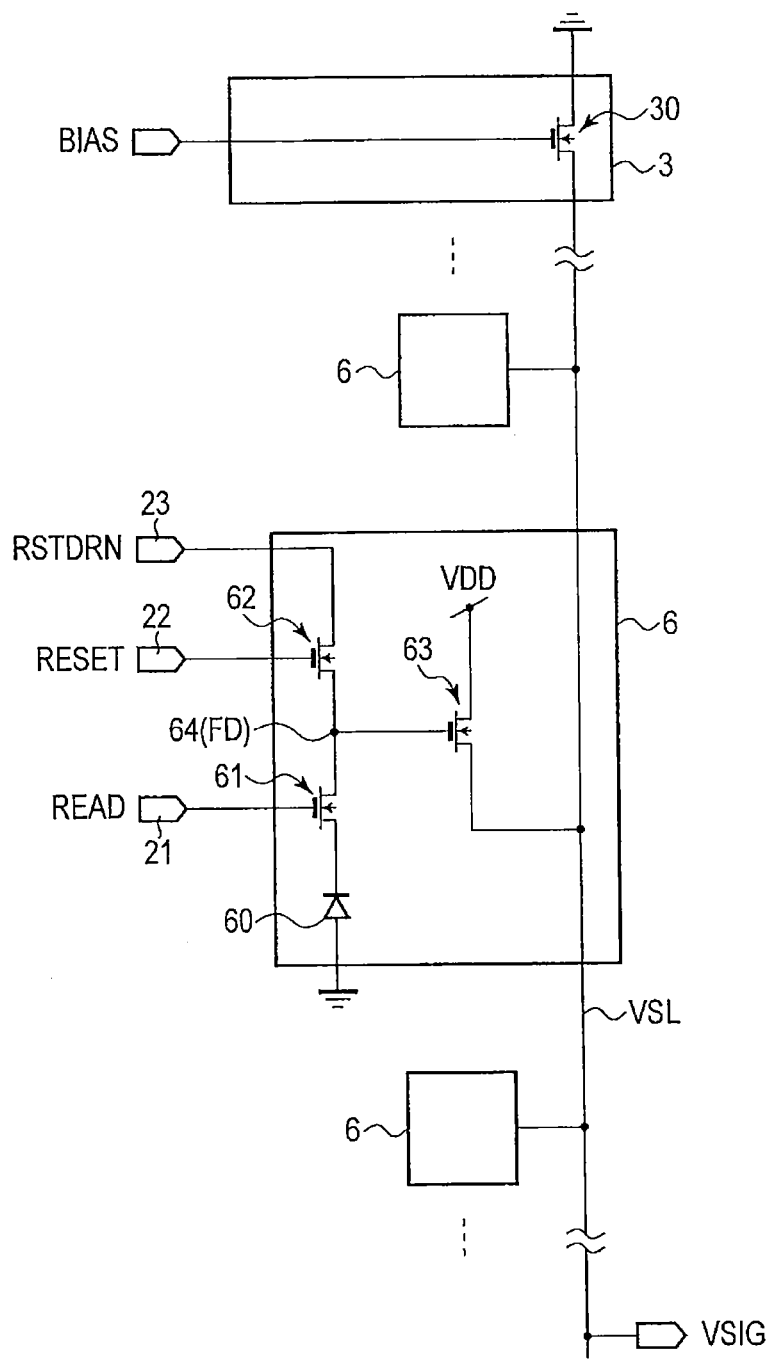
F I G. 2

US 8,854,521 B2

SOLID-STATE IMAGE SENSING DEVICE AND CONTROL METHOD OF SOLID-STATE IMAGE SENSING DEVICE

CROSS-REFERENCE TO RELATED APPLICATIONS

This application is based upon and claims the benefit of priority from Japanese Patent Application No. 2011-200774, filed Sep. 14, 2011, the entire contents of which are incorporated herein by reference.

FIELD

Embodiments described herein relate generally to a solid-state image sensing device and a control method of the solid-state image sensing device.

BACKGROUND

A CMOS image sensor, which mounts a general column analog-to-digital conversion circuit, includes a pixel array in which a plurality of pixel cells are laid out two-dimensionally, a column analog-to-digital conversion circuit for converting pixel signals into digital signals, and a row selection circuit. Each pixel includes a photoelectric conversion element (for example, photodiode) for converting an optical signal from an object into an electrical signal (charge), and a plurality of field effect transistors.

In the operation of the image sensor, the row selection circuit selects pixels from which signals are to be read for each row. Then, pixel signals are simultaneously output from a plurality of selected pixels on the selected row onto signal lines. The output pixel signals are converted into digital signals by the column analog-to-digital conversion circuit.

In the selected pixel, respective transistors are driven to transfer a charge accumulated in the photoelectric conversion element to a signal detection unit, thus detecting and amplifying a charge amount which is accumulated in the photoelectric conversion element and is transferred to the signal detection unit.

In order to improve image quality and reliability of the image sensor, not only the operations of the row selection circuit and analog-to-digital conversion circuit but also the driving method and control method of the transistors in each pixel have been examined.

BRIEF DESCRIPTION OF THE DRAWINGS

FIG. 1 is a block diagram showing the overall arrangement of a solid-state image sensing device according to an embodiment;

FIG. 2 is an equivalent circuit diagram showing the arrangement of a pixel of the solid-state image sensing device according to the embodiment;

DETAILED DESCRIPTION

Figure 3:
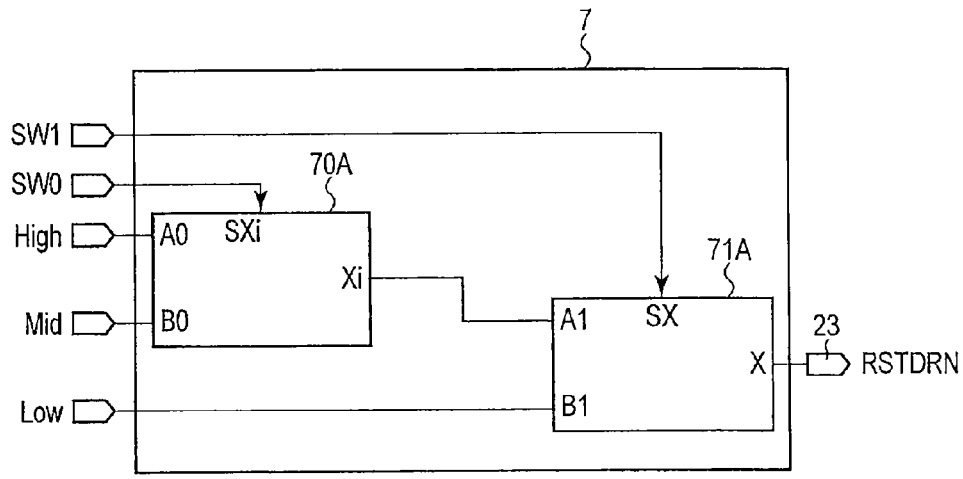
FIG. 3 is a block diagram showing the arrangement of a solid-state image sensing device according to the first embodiment.

Embodiments will be described in detail hereinafter with reference to the drawings. In the following description, the same reference numerals denote elements having the same functions and arrangements, and a repetitive description thereof will be given as needed.

In general, according to one embodiment, a solid-state image sensing device includes a pixel including a photoelectric conversion element configured to convert light from an object into a signal charge, a signal detection unit to which the signal charge accumulated in the photoelectric conversion element is transferred, a first transistor including one end of a current path connected to the photoelectric conversion element and the other end of the current path connected to the signal detection unit, a second transistor including one end of a current path connected to the signal detection unit and the other end of the current path connected to a control signal line, and a third transistor including a gate connected to the signal detection unit and one end of a current path connected to a signal line from which a pixel signal is output; and a control signal selection circuit configured to select a control signal to be applied to the control signal line. The control signal selection circuit sets a potential of the control signal line at a first potential level as the control signal while the pixel signal is read from the pixel, the control signal selection circuit sets the potential of the control signal line at a second potential level as the control signal lower than the first potential level when the pixel is set in an unselected state, and the control signal selection circuit sets the potential of the control signal line at a third potential level as the control signal between the first potential level and the second potential level after the pixel is set in the unselected state.

(1) First Embodiment

A solid-state image sensing device according to the first embodiment will be described below with reference to FIGS. 1, 2, 3, and 4.

(a) Circuit Arrangement

The circuit arrangement of an image sensor as a solid-state image sensing device according to the first embodiment will be described below with reference to FIGS. 1, 2, and 3.

FIG. 1 shows an example of the overall arrangement of the image sensor of this embodiment. Note that the image sensor of this embodiment may be either a front-illuminated image sensor or back-illuminated image sensor.

The image sensor of this embodiment includes a pixel array 1, row selection circuit 2, load circuit 3, analog-to-digital conversion circuit 4, image processing circuit 5, and control unit 10.

The pixel array (also referred to as a pixel unit or pixel region hereinafter) 1 includes a plurality of pixels (unit pixels or pixel circuits) 6. The plurality of pixels 6 are arranged in, for example, an m×n two-dimensional pattern (matrix) along first and second directions. The pixel array 1 includes, for example, an effective pixel region and correction pixel region.

A plurality of pixels 6 arranged along the first direction (row direction) are connected to common row control lines RL. Each row control line RL is a control line group including a plurality of control signal lines 21, 22, and 23. A plurality of pixels 6 arranged along the second direction (column direction) are connected to common vertical signal lines (also called column control lines) VSL. Output signals (referred to as pixel signals or pixel voltages hereinafter) VSIG from the pixels 6 are output onto the vertical signal lines VSL.

A plurality of (for example, m) row control lines RL are connected to the row selection circuit 2. A plurality of (for example, n) vertical signal lines VSL are connected to the load circuit 3 and analog-to-digital conversion circuit 4.

The row selection circuit 2 drives the row control line RL under the control of the control unit 10 to select a plurality of pixels (a row of the pixel array) as read targets connected to the common row control line RL. Also, the row selection circuit 2 sets a plurality of pixels other than read targets in an unselected state (OFF state). Pixels as the read targets will be referred to as selected pixels hereinafter, and those other than the read targets will be referred to as unselected pixels hereinafter.

The row selection circuit 2 drives the pixels 6 under the control of the control unit 10 to substantially simultaneously output pixel signals VSIG from a plurality of pixels 6 connected to the common row control line RL onto the vertical signal lines VSL to which these pixels 6 are connected. The pixel signals VSIG of the pixels for one row connected to the same row control line RL are simultaneously output to the analog-to-digital conversion circuit 4.

The row selection circuit 2 supplies control signals required to drive the pixels 6 to the field effect transistors (described later) in the pixels (unit cells or pixel circuits) 6 respectively at predetermined operation timings under the control of the control unit 10.

The load circuit 3 includes a plurality of field effect transistors 30. Each field effect transistor 30 in the load circuit 3 will be referred to as a load transistor 30 hereinafter. Each load transistor 30 is, for example, an n-channel field effect transistor. One end of a current path of the load transistor 30 is connected to one end of the corresponding vertical signal line VSL. The other end of the current path of the load transistor 30 is connected to the ground terminal. To the gate of the load transistor 30, a bias voltage BIAS is applied. The load transistor 30 functions as a constant current source.

The analog-to-digital conversion circuit 4 is connected to the other end of each of the vertical signal lines VSL.

The analog-to-digital conversion circuit 4 is a column analog-to-digital conversion circuit. The analog-to-digital conversion circuit 4 includes a plurality of column analog-to-digital converters (ADCs) 40. The column ADCs (conversion units) 40 are arranged in correspondence with the respective vertical signal lines VSL, and one column ADC 40 is connected to one vertical signal line VSL.

For example, the analog-to-digital conversion circuit 4 includes sample-and-hold circuits (not shown) used to sample the pixel signals VSIG.

The analog-to-digital conversion circuit 4 applies signal processing to analog pixel signals using the column ADCs 40 to convert the analog pixel signals VSIG into digital signals (digital data) $D_{out}$.

The digital data $D_{out}$, which is the result of digitization by the column analog-to-digital conversion circuit 4 and corresponds to the pixels 6 for one row, is output to the subsequent image processing circuit 5.

The image processing circuit 5 applies correction processing and feature amount calculation processing to the input digital data $D_{out}$ in synchronism with the control of the control unit 10 to form image data for one frame of the pixel array 1, and outputs that image data to a display device (for example, a display).

FIG. 2 is an equivalent circuit diagram showing the internal arrangement of the pixel 6.

As shown in FIG. 2, a plurality of pixels 6 are connected to one vertical signal line VSL.

The image sensor of this embodiment is, for example, a CMOS image sensor.

As shown in FIG. 2, each pixel 6 of the CMOS image sensor includes, for example, one photoelectric conversion element 60, a signal detection unit 64, and a plurality of transistors 61, 62, and 63.

The signal detection unit 64 is formed by a connection node of the transistors 61 and 62. The signal detection unit 64 is, for example, a diffusion layer (impurity semiconductor layer) formed in a semiconductor substrate. The signal detection unit 64 formed of the diffusion layer is called a floating diffusion (FD).

The photoelectric conversion element 60 is, for example, a photodiode 60. The anode of the photodiode 60 is connected to the ground terminal. The cathode of the photodiode 60 is connected to the floating diffusion 64 via a current path of the transistor 61. The photodiode 60 can accumulate a charge (signal charge, accumulated charge) generated inside itself according to an intensity of incident light (light coming from an object).

The pixel 6 includes, for example, the read transistor 61, reset transistor 62, and amplifier transistor 63.

The read transistor 61 is, for example, an n-channel MOS transistor. One end of a current path of the read transistor 61 is connected to the cathode of the photodiode 60. The other end of the current path of the read transistor 61 is connected to the floating diffusion 64. The other end of the current path of the read transistor 61 is connected to one end of a current path of the reset transistor 62 and the gate of the amplifier transistor 63 via the floating diffusion 64.

A control signal READ is input to the gate of the read transistor 61. An ON/OFF state of the read transistor 61 is controlled by control signal. READ.

When a signal corresponding to a charge generated by the photodiode 60 of each pixel 6 is output onto the vertical signal line VSL as an output signal VSIG from the pixel 6, the read transistor 61 is turned on in response to control signal READ. A signal charge from the photodiode 60 is transferred to the floating diffusion 64 via the current path (channel, inversion layer) of the read transistor 61 in the ON state. A voltage corresponding to the charge transferred to the floating diffusion 64 is detected and amplified by the transistor 63 in the pixel 6, and a voltage (referred to as a signal voltage VPD hereinafter) corresponding to the charge generated by the photodiode 60 is output onto the vertical signal line VSL as the pixel signal VSIG.

When the read transistor 61 is in an OFF state, a charge accumulation state of the photodiode 60 is maintained.

For example, the gates of the read transistors 61 of a plurality of pixels 6, which belong to the same row, are commonly connected to a control signal line (also referred to as a read control line hereinafter) 21 via which a control signal (also referred to as a read signal hereinafter) READ is supplied. Control signal READ is supplied from the row selection circuit 2 to the respective read transistors 61.

The reset transistor 62 is, for example, an n-channel MOS transistor. One end (source) of a current path of the reset transistor 62 is connected to the floating diffusion 64. The other end (drain) of the current path of the reset transistor 62 is connected to a control signal line (or control terminal) 23 to which a control signal RSTDRN is supplied.

A control signal RESET is input to the gate of the reset transistor 62. An ON/OFF state of the reset transistor 62 is controlled by control signal RESET.

The reset transistor 62 resets a potential state of the floating diffusion 64.

At an output timing of the pixel signal VSIG of each pixel 6, the reset transistor 62 is turned on in response to control signal RESET. A voltage (or current) according to control signal RSTDRN is applied to the floating diffusion 64 via the current path of the field-effect transistor 62 in the ON state, thereby resetting a potential of the floating diffusion 64.

The potential of the floating diffusion 64, which has received control signal RSTDRN, is detected and amplified by the amplifier transistor 63 in the pixel 6, and a voltage (referred to as a reset voltage VRST hereinafter) of the floating diffusion 64 in a reset state is output onto the vertical signal line VSL as the output signal VSIG from the pixel 6. When the transistor 62 is in an OFF state, the floating diffusion 64 is electrically isolated from the control signal line 23 to which control signal RSTDRN is applied.

For example, the gates of the reset transistors 62 of a plurality of pixels 6, which belong to the same row, are commonly connected to a control signal line (also referred to as a reset control line hereinafter) 22 via which control signal RESET (also referred to as a reset control signal hereinafter) is supplied. For example, one end (drain) of each of the current paths of the reset transistors 62 of the plurality of pixels 6, which belong to the same row, is commonly connected to the control signal line (also referred to as a reset drain control line hereinafter) 23 to which control signal RSTDRN (also referred to as a reset drain signal hereinafter) is supplied. Control signals RESET and RSTDRN are supplied from the row selection circuit 2 to the respective reset transistors 62.

The amplifier transistor 63 is, for example, an n-channel MOS transistor. One end (drain) of a current path of the amplifier transistor 63 is connected to a power supply terminal (or power supply line) VDD. The other end (source) of the current path of the amplifier transistor 63 is connected to the vertical signal line VSL. The gate of the amplifier transistor 63 is connected to the floating diffusion 64.

The transistor 63 and load circuit 3 form a source-follower.

By applying the potential of the floating diffusion 64 to the gate of the transistor 63 as the source-follower, the transistor 63 detects and amplifies the magnitude of the potential of the floating diffusion 64. A value obtained by shifting a predetermined voltage from the potential of the floating diffusion 64 is output onto the vertical signal line VSL as the pixel signal VSIG indicating the signal voltage VPD or reset voltage VRST.

One end (drain) of the current path of the amplifier transistor 63 is not connected to the signal line 23, to which the reset drain signal RSTDRN is supplied. The drain of the amplifier transistor 63 and that of the reset transistor 62 are electrically isolated from each other, and are controlled by different potentials.

Note that the arrangement of the transistors in the pixel 6 is not limited to the example shown in FIG. 2, and other circuit arrangements may be adopted. For example, like in a 2-pixel/cell structure, a circuit arrangement (unit cell) in which two or more photodiodes 60 may be commonly connected to one floating diffusion, and may share the reset transistor 62 and amplifier transistor 63 may be adopted. Also, a transistor (address transistor) used to select each pixel may be further added.

For example, the signal voltage VPD and reset voltage VRST output from each pixel 6 are converted from analog signals into digital signals by digital counter processing of the analog-to-digital conversion circuit 4. The signal voltage VPD and reset voltage VRST are converted into a digital value $D_{out}$ corresponding to a difference voltage between the signal voltage VPD and reset voltage VRST by correlated double sampling (CDS) by the analog-to-digital conversion circuit 4.

The image sensor of this embodiment includes a control signal selection circuit 7.

The control signal selection circuit 7 outputs a control signal (potential) required to drive the transistors 61 and 63 in each pixel 6 to that pixel 6 via the row selection circuit 2. The control signal selection circuit 7 outputs the reset drain signal RSTDRN of the reset transistor 62.

The control signal selection circuit (also referred to as a reset drain signal selection circuit or potential selection circuit hereinafter) 7 outputs the reset drain signal RSTDRN having a plurality of potentials (levels) to a plurality of pixels 6 connected to the common row control line RL at predetermined operation timings via the row selection circuit 2 in accordance with the operations of these pixels 6. The control signal selection circuit 7 may output the read signal READ of the read transistor 61 and the reset control signal RESET of the reset transistor 62.

A potential generation circuit 8 generates a potential having a predetermined magnitude corresponding to the operation of the pixel 6. For example, the potential generation circuit 8 includes a charge pump (booster circuit) 80 required to boost up the power supply voltage VDD. For example, the potential generation circuit 8 includes a step-down circuit for stepping down the power supply voltage and a constant voltage source (or constant current source). The potential generation circuit 8 transfers potentials (voltages) having different magnitudes to the control signal selection circuit 7 according to the operations of the pixel 6.

The control signal selection circuit 7 selects a potential corresponding to the operation of the pixel 6 of a plurality of potentials of different magnitudes generated by the potential generation circuit 8, and outputs the selected potential to the reset transistor 62 in the pixel 6 as the reset drain signal RSTDRN.

The internal arrangement of the control signal selection circuit 7 included in the image sensor of this embodiment will be described below with reference to FIG. 3.

FIG. 3 shows the internal arrangement of the control signal selection circuit 7 included in the image sensor of this embodiment.

In the image sensor of this embodiment, the control signal selection circuit 7 selects one of potentials (potential levels) of three magnitudes having different magnitudes according to the operations of respective pixels 6 which belong to a common row in the pixel array 1. Then, the control signal selection circuit 7 outputs the selected potential to the pixels 6 as the reset drain signal RSTDRN.

To the control signal selection circuit 7, a high potential (an H-level potential), a low potential (an L-level potential), and a medium potential (an M-level potential) between high and low are input.

As shown in FIG. 3, the control signal selection circuit 7 is formed using, for example, two selection units 70A and 71A. For example, level shifters are used as selection units 70A and 71A.

Each of selection units 70A and 71A has two input terminals A0 and B0 or A1 and B1, and two values (two potentials) are input to each of selection units 70A and 71A.

Each of selection units 70A and 71A has one control terminal SXi or SX and one output terminal Xi or X. Each of selection units 70A and 71A selects one of potentials input to the two input terminals A0 and B0 or A1 and B1 based on a control signal (also referred to as a switch signal hereinafter)

SW0 or SW1 input to control terminal SXi or SX, and outputs the selected potential from output terminal Xi or X. In the following description, outputs from output terminals Xi and X will be described as outputs Xi and X.

For example, switch signal SW0 or SW1 can assume logical 1 (1 signal) or logical 0 (0 signal). For example, logical 1 corresponds to approximately the power supply voltage VDD, and logical 0 corresponds to approximately ground potential GND.

For example, when switch signal SW0 or SW1 is logical 1, a potential input to input terminal A0 or A1 of selection unit 70A or 71A is selected. On the other hand, when switch signal SW0 or SW1 is logical 0, a potential input to input terminal B0 or B1 of selection unit 70A or 71A is selected.

Output terminal Xi of selection unit 70A is connected to input terminal A1 of selection unit 71A.

In the following description, a terminal (input terminal A0 in this case) to which the high potential is input will be referred to as a high terminal, and a terminal (input terminal B1 in this case) to which the low potential is input will be referred to as a low terminal. Also, in the following description, a terminal (input terminal B0 in this case) to which the medium potential is input will be referred to as a medium terminal.

In the control signal selection circuit 7 shown in FIG. 3, the high potential and medium potential are respectively input to input terminals A0 and B0 of selection unit 70A. Output Xi of selection unit 70A and the low potential are respectively input to input terminals A1 and B1 of selection unit 71A after selection unit 70A.

That is, selection unit 70A selects one of the high and medium potentials based on switch signal SW0 to decide an intermediate output Xi in the control signal selection circuit 7. The subsequent selection unit 71A selects one of the intermediate output Xi and the Low-potential based on switch signal SW1, and outputs its output X as the reset drain signal RSTDRN.

For example, upon application of switch signal SW0 at logical 1, selection unit 70A selects the high potential as the intermediate output Xi; upon application of switch signal SW0 at logical 0, it selects the medium potential as the intermediate output Xi. Upon application of switch signal SW1 at logical 1, selection unit 70B selects the input intermediate output Xi (high or medium potential) as output X; upon application of switch signal SW0 at logical 0, it selects the low potential as output X. Thus, one of the potentials of the three magnitudes is output from the control signal selection circuit 7 as the reset drain signal RSTDRN.

The reset drain signal RSTDRN of the selected potential is substantially simultaneously supplied to the drains of the reset transistors 62 in the pixels 6 connected to the common row control line (drain signal line 23).

The high potential (first driving potential) used as the reset drain signal RSTDRN is set to be a potential (voltage) higher than the power supply voltage VDD. However, different high potentials are set depending on the specifications of power supply voltages of chips of image sensors, and the high potential can assume a voltage ranging from about 3 to 5V.

When the potential higher than the power supply voltage VDD is applied to the drain of the reset transistor 62, a charge amount that can be accumulated on the photodiode 60 in the pixel 6 is increased, thus broadening dynamic ranges of the pixel 6 and image sensor.

The low potential (second driving potential) used as the reset drain signal RSTDRN is set to be a potential which suffices to turn off the amplifier transistor 63 in the pixel 6, for example, a voltage smaller than a threshold voltage of the transistor. However, the low potential preferably assumes a magnitude greater than zero (ground potential). For example, the low potential greater than zero is generated by the potential generation circuit 8 by regulating the power supply voltage or boosting the ground potential.

The medium potential (third driving potential, middle potential) used as the reset drain signal RSTDRN is set to be, for example, about the power supply voltage VDD. The power supply voltage VDD is about 2.8 to 3.5 V according to the specification of the image sensor.

The medium potential is not limited to the power supply voltage VDD and may have a magnitude between the power supply voltage VDD and ground voltage GND as long as it is a potential having a middle magnitude between the high and low potentials. Note that the magnitude of the high potential may be set to be equal to the power supply voltage VDD and the low potential may be set to ground potential (0 V) according to the specification of the image sensor.

In this embodiment, when the pixel 6 is selected as a read target of the pixel signal VSIG, the high potential is used as the reset drain signal RSTDRN, and the potential of the drain signal line 23 is set to the high potential. That high potential is applied to the drain of the reset transistor 62.

When the read operation of the pixel signal VSIG from the pixel 6 is complete and the pixel 6 is set in the unselected state (when the amplifier transistor is turned off), the low potential is used as the reset drain signal RSTDRN, and the potential of the drain signal line 23 is set to be the low potential. The low potential is applied to the drain of the reset transistor 62.

Then, during a period (standby period) in which the pixel 6 is maintained in the unselected state, the medium potential is used as the reset drain signal RSTDRN, and the potential of the drain signal line 23 is set to be the medium potential. That medium potential is applied to the drain of the reset transistor 62. Hereinafter, a state in which the medium potential is applied to the drain of the reset transistor 62 is called a standby state.

As described above, in the image sensor of this embodiment, three potentials as control signal RSTDRN (reset drain signal) are applied to one end (drain) of the current path of the reset transistor 62 in the pixel 6, and the pixel 6 and the reset transistor 62 in that pixel 6 are driven by these three potentials.

When two magnitudes, that is, the high and low potentials are used as the reset drain signal RSTDRN of the reset transistor 62 like in a general image sensor, the following problems are posed.

In an image sensor using a binary reset drain signal RSTDRN, the high potential (a potential greater than or equal to the power supply voltage VDD) is often applied to the drains of the reset transistors during most of a period upon driving the image sensor, so as to speed up the operation of the image sensor. When a high voltage is kept applied to the transistors, semiconductor regions or wirings where the transistors are formed deteriorate, thus lowering the reliability of the transistors.

When the low potential is applied to the drains of the reset transistors of the unselected pixels, since the potential of wirings (vertical signal lines and the like) as discharge lines is low, a charge leakage may occur between selected and unselected pixels connected to the same vertical signal line VSL.

For these reasons, when the reset transistors and amplifier transistors in the pixels 6 are driven by the binary reset drain signal, that is, the high and low potentials like in the general image sensor, the reliability of the image sensor and quality of an image to be formed may deteriorate.

When the pixels 6 and the transistors in these pixels 6 are driven using a ternary reset drain signal RSTDRN (high, low, and medium potentials) like in the image sensor of this embodiment, an application period of the medium potential having the middle magnitude between the high and low potentials is assured in the driving sequence of the image sensor.

For example, upon driving the entire pixel array 1 of the image sensor, an application period of the high potential in a certain pixel (read period of a pixel signal) is shorter than that of the medium potential (standby period) in that pixel.

Therefore, since the application period of the high potential is partially replaced by that of the medium potential lower than the high potential, the application period of the high potential in the driving sequence of the image sensor can be reduced. Therefore, the image sensor of this embodiment can suppress degradations of elements due to application of a high potential over a long period.

Also, in the image sensor of this embodiment, since the medium potential higher than the low potential is applied to the drain of the reset transistor 62 of each pixel 6, a potential difference between neighboring pixels can be reduced compared to a case in which the low potential is applied to the reset transistor 62 of the pixel 6, a charge leakage between neighboring pixels, which share the vertical signal line VSL, can be suppressed from being generated.

Therefore, according to the image sensor of the first embodiment, the reliability and image quality of the image sensor can be improved.

(b) Operation

A driving method of the solid-state image sensing device (image sensor) of the first embodiment will be described below with reference to FIG. 4. Note that the operation of the image sensor of this embodiment will be described in this case using FIGS. 1, 2, and 3 as needed.

Figure 4:
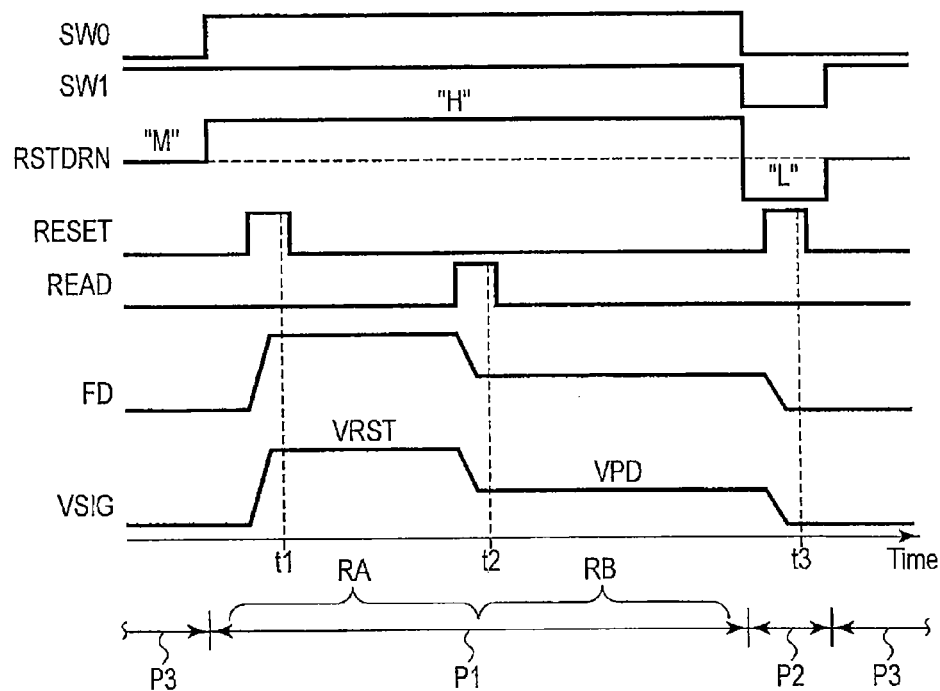
FIG. 4 is a timing chart showing the operation of the solid-state image sensing device according to the first embodiment.

FIG. 4 is a timing chart showing the driving method of the image sensor of this embodiment.

At an image formation timing, the row selection circuit 2 selects a predetermined row control line RL under the control of the control unit 10. A plurality of pixels 6 connected to the selected row control line RL are activated as read targets.

The pixels 6 before activation are set in the unselected state, and the reset drain signal RSTDRN of the medium potential (for example, the voltage VDD) is applied to the drains of the reset transistors 62 of the respective pixels 6, as shown in FIG. 4.

As shown in FIG. 4, when the pixels 6 are selected (first period P1, selection period), the reset drain signal RSTDRN is set to be changed from the medium potential to the high potential (a magnitude greater than voltage VDD).

In the control signal selection circuit (reset drain signal selection circuit) 7 shown in FIG. 4, switch signal SW0 is set to logical 1 and applied to selection unit 70A. Selection unit 70A to which the high and medium potentials are input selects the high potential as the intermediate output Xi based on applied switch signal SW0.

Also, switch signal SW1 is set to logical 1 and applied to selection unit 71A. Selection unit 71A to which the low potential (>0 V) and the high potential as the intermediate output Xi are applied selects the input high potential as output X based on applied switch signal SW1.

Thus, the control signal selection circuit 7 selects the high potential as the reset drain signal RSTDRN. The potential of the drain signal line 23 is set to be the high potential, and the high potential is applied to the drains of the reset transistors 62 of the selected pixels 6. Since the high potential is applied to the reset transistors 62, charge amounts which can be accumulated on the floating diffusions 64 can increase, thus improving the dynamic range of the image sensor.

For example, the high potential is generated by the potential generation circuit 8 by boosting up the power supply voltage VDD.

In order to control each load transistor 30 to operate as a constant current source, the bias voltage BIAS is applied to the gate of the load transistor 30. In this state, for example, the reset control signal RESET of logical 1 is applied to the gate of each reset transistor 62 at time t1, thus turning on the reset transistor 62.

Thus, the high potential is applied to the floating diffusion 64 via the current path of the reset transistor 62. The potential FD of the floating diffusion 64 varies (rises) according to the magnitude of the high potential. Upon rising of the potential FD of the floating diffusion 64, the amplifier transistor 63 is turned on. At this time, the read transistor 61 is turned off by the read control signal READ.

A current flows through the load circuit 3 including the load transistor 30 in the ON state. For this reason, the amplifier transistor 63 and load circuit 3, which form the source-follower, output a value obtained by shifting from the potential of the floating diffusion 64 to a certain potential (constant voltage) onto the vertical signal line VSL as the reset voltage VRST of the pixel 6. The potential (pixel voltage) VSIG of the vertical signal line VSL varies to about the reset voltage VRST.

The output reset voltage VRST is sampled by the sample-and-hold circuit (not shown) of the subsequent column analog-to-digital conversion circuit 4 at time t1, and is input to the column ADC 40.

After the reset voltage VRST is sampled (in/after a first read period RA), the reset transistor 62 is turned off. For example, the read control signal READ at logical 1 is applied to the gate of the read transistor 61 at time t2, thus turning on the read transistor 61.

A signal charge accumulated in the photodiode 60 is transferred to the floating diffusion 64 via the current path of the read transistor 61 in the ON state. Then, the potential FD of the floating diffusion varies (for example, falls) to a potential according to the signal charge transferred from the photodiode 60. The amplifier transistor 63 operates by a driving force according to the potential FD of the floating diffusion 64.

The potential according to the transferred signal charge is detected and amplified by the amplifier transistor 63, and is output onto the vertical signal line VSL as the signal voltage VPD of that pixel. The potential VSIG on the vertical signal line VSL varies to about the signal voltage VPD.

The output signal voltage VPD is sampled by the sample-and-hold circuit at time t2, and is input to the column ADC 40.

For example, switch signals SW0 and SW1 are maintained at logical 1 during a period in which the reset voltage VRST and signal voltage VPD are read. That is, during a read period (sampling period) P1 of the pixel signals VRST and VPD from each pixel, the high potential is applied to the control signal line 23, and is applied to the drain of the reset transistor 62.

After the read operation of the signal voltage VPD is complete (after a second read period RB), that pixel 6 is set in an unselected state (second period P2, unselected period or OFF period). As shown in FIG. 4, switch signal SW0 in the control signal selection circuit 7 is controlled to transit from logical 1 to 0, and switch signal SW1 at logical 0 is input to selection unit 71A. Selection unit 71A selects the low potential applied to input terminal B1 as output X based on switch signal SW1 at logical 0. The low potential selected by the control signal selection circuit 7 is set as the reset drain signal RSTDRN, and the potential of the drain signal line 23 is set to be the low potential. Then, the low potential is applied to the drain of the reset transistor 62.

Note that when the reset drain signal RSTDRN is set to low by selection unit 71A, the level of switch signal SW0 to selection unit 70A can be either logical 1 or 0. However, since the medium potential is selected after application of the low potential, it is preferable to control switch signal SW0 to selection unit 70A to transit from logical 1 to 0 substantially simultaneously with transition of switch signal SW1 to selection unit 71A to logical 0.

The reset drain signal RSTDRN is set at the low potential, and the reset transistor 62 is turned on by the reset control signal RESET. Thus, the potential FD of the floating diffusion 64 is set to be the low potential as the reset drain signal RSTDRN. Since the low potential is a voltage which is low enough to turn off the amplifier transistor 63 (a voltage lower than the threshold voltage of the transistor), the amplifier transistor 63 is set in an OFF set. Since the amplifier transistor 63 is turned off, this pixel 6 substantially becomes an unselected pixel.

For example, after it is detected that the potential FD of the floating diffusion and the signal level of the vertical signal line VSL are changed to a predetermined potential level, and the pixel 6 is set in an unselected state at time t3, the reset transistor 62 is turned off by the reset control signal RESET.

Then, as shown in FIG. 4, the reset drain signal RSTDRN is set at the medium potential (third period P3, standby period). More specifically, switch signal SW0 of at logical 0 is applied to selection unit 70A, and switch signal SW1 at logical 1 is applied to selection unit 71A. The medium potential is selected by selection unit 70A as the intermediate output Xi, and the intermediate output Xi as the medium potential is selected by selection unit 71A as output X.

As a result, the medium potential is selected as the reset drain signal RSTDRN, and the potential of the drain signal line 23 is set to be the medium potential. The medium potential is applied to the unselected pixel. In the unselected pixel, the medium potential is applied to the drain of the reset transistor 62 in the OFF state.

The sampled reset voltage VRST and signal voltage VPD undergo the digital processing and CDS processing by the column ADC 40, and is then output as digital data Dout to the subsequent image processing circuit 5. The aforementioned operations are sequentially executed while switching the selected pixels for respective rows.

Then, the image processing circuit 5 applies correction processing and feature amount calculation processing to the input digital data Dout, thus forming an image for one frame of the pixel array 1. The formed image is output to a display unit (not shown).

As described above, the driving sequence of the image sensor of this embodiment is complete.

As described above using FIGS. 1, 2, 3, and 4, the image sensor of this embodiment drives the pixels 6 and transistors 62 and 63 in the pixels 6 by the ternary control signal (reset drain signal) including the high potential, low potential, and medium potential as a middle potential between the high and low potentials.

Therefore, degradation of elements caused by application of the high potential over a long period and a charge leakage between neighboring pixels caused by application of the low potential can be suppressed using the medium potential in place of the high and low potentials.

Therefore, according to the image sensor and the driving method of the image sensor according to the first embodiment, the reliability and image quality of the image sensor can be improved.

(2) Second Embodiment

A solid-state image sensing device (image sensor) according to the second embodiment will be described below with reference to FIGS. 5 and 6. Note that substantially the same components and functions in the second embodiment as those in the image sensor of the first embodiment will be explained as needed.

The image sensor of the second embodiment is different from that of the first embodiment in the internal arrangement of a control signal selection circuit (reset drain signal selection circuit) 7.

Figure 5:
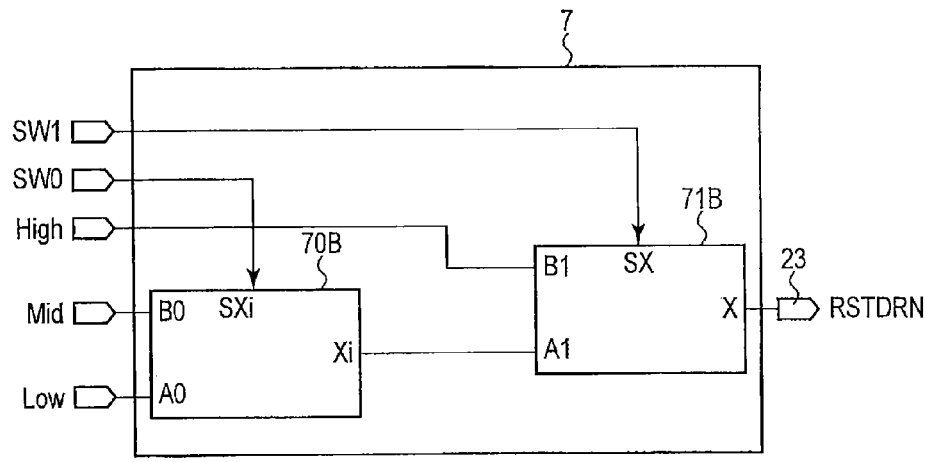
FIG. 5 is a block diagram showing the arrangement of a solid-state image sensing device according to the second embodiment.

FIG. 5 shows the internal arrangement of the control signal selection circuit (reset drain signal selection circuit) 7 in the image sensor according to the second embodiment.

As shown in FIG. 5, a low potential and medium potential are respectively applied to input terminals A0 and B0 of a selection unit 70B which selects an intermediate output Xi. The intermediate output Xi of the medium or low potential and a high potential are respectively applied to input terminals A1 and B1 of a selection unit 71B which selects an output X.

In selection unit 70B, the medium potential is selected as the intermediate output Xi based on a switch signal SW0 at logical 1, and the low potential is selected as the intermediate output Xi based on switch signal SW0 at logical 0. In selection unit 71B, the high potential is selected as output X based on a switch signal SW1 at logical 1, and the intermediate output (medium or low potential) Xi is selected as output X based on switch signal SW1 at logical 0.

The operation of the control signal selection circuit 7 included in the image sensor of the second embodiment will be described below with reference to FIGS. 5 and 6. Note that the operation of the overall image sensor is the same as that in the first embodiment, and a description thereof will not be repeated.

Figure 6:
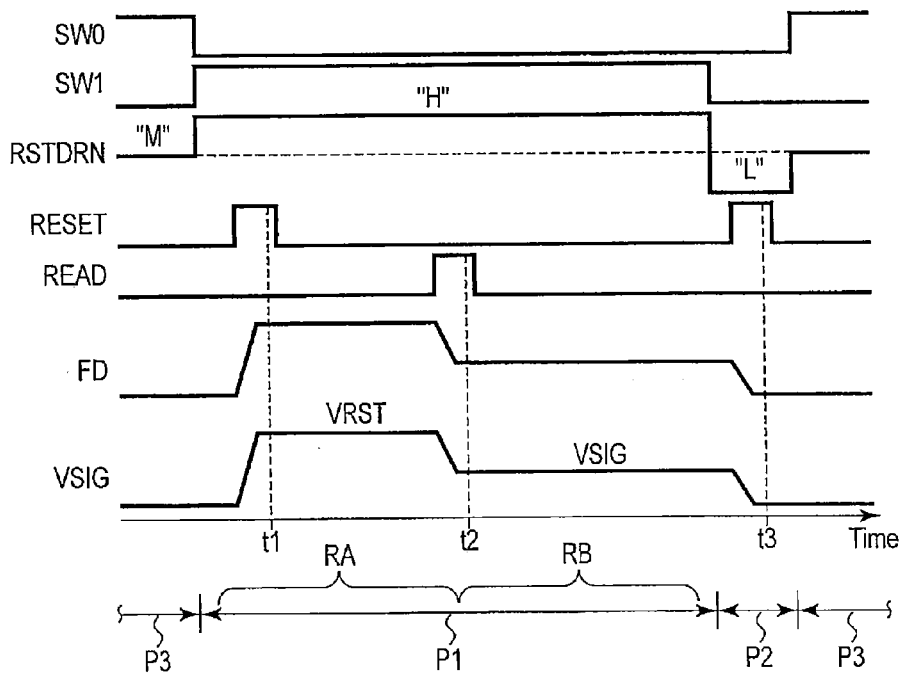
FIG. 6 is a timing chart showing the operation of the solid-state image sensing device according to the second embodiment.

FIG. 6 is a timing chart for explaining the driving method of the image sensor of this embodiment.

As shown in FIG. 6, upon reading a pixel voltage VSIG, the high potential (>VDD) is selected as a reset drain signal RSTDRN, and the potential of a drain signal line 23 is set to be the high potential. In this case, switch signal SW1 for selection unit 71B is set to logical 1.

At this time, switch signal SW0 for selection unit 70B may be set at either logical 0 or 1. However, when the reading of the pixel voltage VSIG is complete, and a pixel 6 is set in an unselected state, the reset drain signal RSTDRN is controlled to transmit from the high potential to the low potential. For this reason, it is preferable to set switch signal SW0 to logical 0 and to set the intermediate output Xi of selection unit 70B in a holding state of the low potential substantially simultaneously with setting of switch signal SW1 to logical 1.

As in the first embodiment, sampling operations of a reset voltage VRST and signal voltage VPD are started at predetermined timings t1 and t2. After that, as shown in FIG. 6, in order to set the pixel 6 in an unselected state, switch signal SW0 is maintained at logical 0, and the signal level of switch signal SW1 is controlled to transit from logical 1 to 0.

With this control, selection unit 71B selects the low potential as the intermediate output Xi of selection unit 70B. The low potential as output X of selection unit 71B is supplied to the drain signal line 23 as the reset drain signal RSTDRN. The potential of the drain signal line 23 is set to low.

Then, the low potential is applied to a floating diffusion 64 and the gate of an amplifier transistor 63 via a reset transistor 62 in an ON state. As a result, the amplifier transistor 63 is turned off, and the pixel 6 is set in the unselected state.

As shown in FIG. 6, after the reset transistor 62 is turned off, the signal level of switch signal SW0 is controlled to transit from logical 0 to 1, and the signal level of switch signal SW1 is maintained at logical 0.

Thus, selection unit 70B selects the medium potential as the intermediate output Xi, and selection unit 71B selects the medium potential as output X. Therefore, the medium potential is set as the reset drain signal RSTDRN, and is applied to the drain signal line 23 and the drain of the reset transistor 62 in the OFF state.

As described above, like in the image sensor of the second embodiment, even when the internal arrangement of the control signal selection circuit 7 is different from the first embodiment, the control signal selection circuit 7 can select one of potentials of three magnitudes, that is, the high, low, and medium potentials as a control signal (reset drain signal) to be applied to the drain of the reset transistor 62. Then, the control signal selection circuit 7 can apply the selected potential level to the pixel 6 and transistors in the pixel 6 at predetermined operation timings.

Therefore, as in the first embodiment, the image sensor of this embodiment can suppress degradation of elements caused by application of the high potential over a long period and a charge leakage between neighboring pixels caused by application of the low potential, since it applies the medium potential between the high and low potentials to the pixel 6 in place of the high and low potentials during a predetermined period of the driving sequence of the image sensor.

Note that the control signal selection circuit 7 may have an arrangement in which the low and high potentials are input to selection unit 70A or 70B used to select the intermediate output Xi, and the intermediate output Xi and the medium potential are input to selection unit 71A or 71B used to select output X as the reset drain signal. In this case as well, one of the potentials of the three magnitudes can be applied to the pixel 6 based on switch signals SW0 and SW1 to selection units 70A or 70B and 71A or 71B.

As described above, the image sensor and the driving method of the image sensor according to the second embodiment can improve the reliability and image quality of the image sensor as in the first embodiment.

(3) Application Example

An application example of the solid-state image sensing device of each embodiment will be described below with reference to FIG. 7.

The solid-state image sensing device (image sensor) of the embodiment is applied to a digital camera or a mobile phone with a camera as a module.

Figure 7:
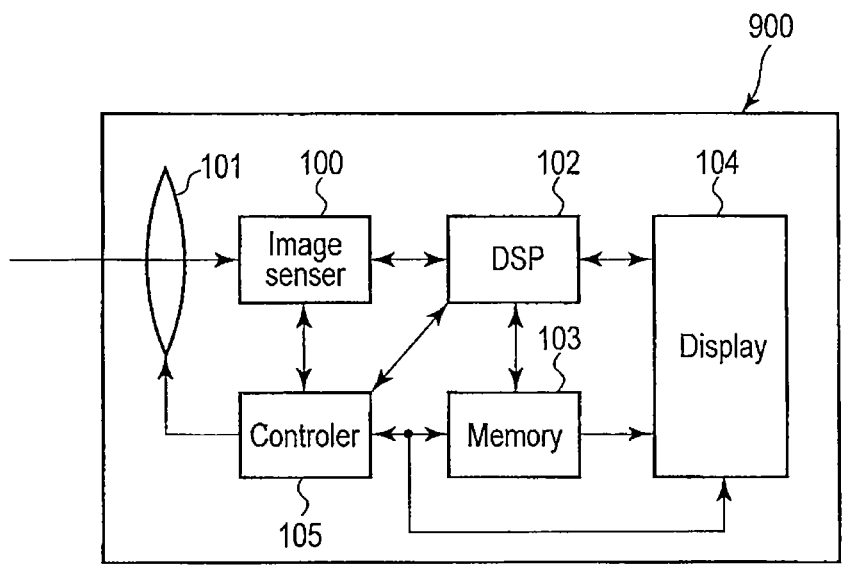
FIG. 7 is a block diagram showing an application example of the solid-state image sensing device according to the embodiment.

FIG. 7 is a block diagram showing the application example of the image sensor of this embodiment.

A camera (or a mobile phone with a camera) 900 including an image sensor 100 of this embodiment includes, for example, an optical lens unit (lens unit) 101, signal processor (for example, DSP: Digital Signal Processor) 102, memory 103, display 104, and controller 105 in addition to the image sensor 100.

The image sensor 100 converts light from an object into an electrical signal.

The lens unit 101 focuses light from an object on the image sensor 100 to form an image corresponding to the light from the object on the image sensor 100. The lens unit 101 includes a plurality of lenses, and can mechanically and/or electrically control optical characteristics (for example, a focal length).

The DSP 102 processes a signal output from the image sensor 100. The DSP 102 forms an image (image data) corresponding to the object based on the signal from the image sensor 100.

The memory 103 stores the image data from the DSP 102. The memory 103 can also store externally supplied signals and data. The memory 103 may be a memory chip such as DRAM or flash memory incorporated in the camera 900 or a memory card or USB memory detachable from the main body of the camera 900.

The display 104 displays image data from the DSP 102 or memory 103. The data from the DSP 101 or memory 103 is still image data or moving image data.

The controller 105 controls the operations of the components 100 to 104 in the camera.

The camera 900 including the image sensor 100 of this embodiment can improve image quality of an image to be formed by the aforementioned arrangement and operation of the image sensor 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state image sensing device comprising:
a pixel including a photoelectric conversion element configured to convert light from an object into a signal charge, a signal detection unit to which the signal charge accumulated in the photoelectric conversion element is transferred, a first transistor including one end of a current path connected to the photoelectric conversion element and the other end of the current path connected to the signal detection unit, a second transistor including one end of a current path connected to the signal detection unit and the other end of the current path connected to a control signal line, and a third transistor including a gate connected to the signal detection unit and one end of a current path connected to a signal line from which a pixel signal is output; and
a control signal selection circuit configured to select a control signal to be applied to the control signal line,
wherein the control signal selection circuit sets a potential of a control signal applied to the control signal line at a first potential level while the pixel signal is read from the pixel,
the control signal selection circuit sets the potential of the control signal applied to the control signal line at a second potential level lower than the first potential level when the pixel is set in an unselected state, and
the control signal selection circuit sets the potential of the control signal applied to the control signal line at a third potential level between the first potential level and the second potential level after the pixel is set in the unselected state.

2. The device according to claim 1, wherein the third potential level is set to be a power supply voltage.

3. The device according to claim 2, wherein the first potential level is set to be a voltage higher than the power supply voltage, and the second potential level is set to be a voltage at which the third transistor is turned off.

4. The device according to claim 3, wherein the second potential level is higher than 0 V.

5. The device according to claim 1, wherein the control signal selection circuit includes
a first selection unit having a first input terminal, a second input terminal, a first output terminal used to output a first output signal, and a first control terminal to which a first selection signal is applied, and
a second selection unit having a third input terminal, a fourth input terminal, a second output terminal used to output a second output signal as the control signal, and a second control terminal to which a second selection signal is applied, and
the first output terminal is connected to the third input terminal, and the second output terminal is connected to the control signal line.

6. The device according to claim 5, wherein the first potential level is applied to the first input terminal,
the third potential level is applied to the second input terminal,
the second potential level is applied to the fourth input terminal,
the first selection unit selects one of the first potential level and the third potential level as the first output signal based on the first selection signal, and
the second selection unit selects one of the third potential level and the first output signal as the second output signal based on the second selection signal.

7. The device according to claim 6, wherein when the second potential level is selected as the second output signal, the third potential level is selected as the first output signal.

8. The device according to claim 5, wherein the second potential level is applied to the first input terminal,
the third potential level is applied to the second input terminal,
the first potential level is applied to the fourth input terminal,
the first selection unit selects one of the second potential level and the third potential level as the first output signal based on the first selection signal, and
the second selection unit selects one of the first potential level and the first output signal as the second output signal based on the second selection signal.

9. The device according to claim 8, wherein when the first potential level is selected as the second output signal, the second potential level is selected as the first output signal.

10. The device according to claim 1, wherein during a first read period of a first period in which the pixel signal is read, the first transistor is set in an OFF state, the second transistor is set in an ON state, and the first potential level is applied to the signal detection unit via the second transistor in the ON state,
during a second read period of the first period, the first transistor is set in the ON state, the second transistor is set in the OFF state, and a signal charge from the photoelectric conversion element is transferred to the signal detection unit via the first transistor in the ON state,
during a second period in which the pixel is set in the unselected state, the first transistor is set in the OFF state, the second transistor is set in the ON state, and the second potential level is applied to the signal detection unit via the second transistor in the ON state, and
during a third period except for the first period and the second period, the first transistor and the second transistor are set in the OFF state, and the signal detection unit is electrically isolated from the photoelectric conversion element and the control signal line.

11. The device according to claim 1, wherein the other end of the current path of the third transistor is electrically isolated from the other end of the current path of the second transistor, and is applied with a power supply voltage.

12. The device according to claim 1, further comprising:
a potential generation circuit including a booster circuit configured to generate the first potential level by boosting up the power supply voltage as the second potential level.

13. The device according to claim 1, further comprising:
a load transistor having a current path connected to the signal line and serving as a current source,
wherein the third transistor and the load transistor form a source-follower.

14. A camera comprising:
the solid-state image sensing device according to claim 1;
an optical lens unit configured to focus light from an object on the solid-state image sensing device; and
a signal processing circuit configured to process a signal output from the solid-state image sensing device.

15. A control method of a solid-state image sensing device, comprising:
setting a potential of a control signal applied to a control signal line at a first potential level under the control of a control signal selection circuit when a pixel signal of a pixel is read, the pixel including a photoelectric conversion element configured to convert light from an object into a signal charge, a signal detection unit to which the signal charge accumulated in the photoelectric conversion element is transferred, a first transistor including one end of a current path connected to the photoelectric conversion element and the other end of the current path connected to the signal detection unit, a second transistor including one end of a current path connected to the signal detection unit and the other end of the current path connected to the control signal line, and a third transistor including a gate connected to the signal detection unit and one end of a current path connected to a signal line from which the pixel signal is output;
setting the potential of the control signal applied to the control signal line at a second potential level lower than the first potential level under the control of the control signal selection circuit when the pixel is set in an unselected state; and
setting the potential of the control signal applied to the control signal line at a third potential level between the first potential level and the second potential level under the control of the control signal selection circuit after the pixel is set in the unselected state.

16. The method according to claim 15, wherein
during a first read period of a first period in which the pixel signal is read, the first transistor is set in an OFF state, the second transistor is set in an ON state, and the first potential level is applied to the signal detection unit via the second transistor in the ON state under the control of the control signal selection circuit,
during a second read period of the first period, the first transistor is set in the ON state, the second transistor is set in the OFF state, and a signal charge from the photoelectric conversion element is transferred to the signal detection unit via the first transistor in the ON state,
during a second period in which the pixel is set in the unselected state, the first transistor is set in the OFF state, the second transistor is set in the ON state, and the second potential level is applied to the signal detection unit via the second transistor in the ON state under the control of the control signal selection circuit, and during a third period after the pixel is set in the unselected state, the first transistor and the second transistor are set in the OFF state, the signal detection unit is electrically isolated from the photoelectric conversion element and the control signal line, and the third potential level is applied to the control signal line under the control of the control signal selection circuit.

17. The method according to claim 15, wherein the third potential level is set to be a power supply voltage.

18. The method according to claim 17, wherein the first potential level is set to be a voltage higher than the power supply voltage, and the second potential level is set to be a voltage at which the third transistor is turned off.

19. The method according to claim 18, wherein the second potential level is higher than 0 V.

20. The method according to claim 18, wherein when the pixel signal is read, the power supply voltage is applied to the other end of the current path of the third transistor.

* * * * *